United States Patent [19]

Yasutomi et al.

[11] Patent Number: 4,923,829

[45] Date of Patent: May 8, 1990

[54] COMPOSITE CERAMICS AND METHOD OF MAKING THE SAME

[75] Inventors: Yoshiyuki Yasutomi, Katsuta; Yasuo Matsushita; Kousuke Nakamura, both of Hitachi, all of Japan

[73] Assignee: Hitachi, Ltd., Tokyo, Japan

[21] Appl. No.: 312,300

[22] Filed: Feb. 17, 1989

Related U.S. Application Data

[63] Continuation of Ser. No. 92,614, Sep. 3, 1987, abandoned.

[30] Foreign Application Priority Data

Sep. 5, 1986 [JP] Japan .................. 61-207927

[51] Int. Cl.$^5$ .................. C04B 35/58; C04B 35/76
[52] U.S. Cl. .................. 501/95; 501/97; 501/98; 501/154
[58] Field of Search .................. 501/95, 98, 97, 154; 264/DIG. 19

[56] References Cited

U.S. PATENT DOCUMENTS

| | | | |
|---|---|---|---|
| 4,101,616 | 7/1978 | Buljan | 501/95 |
| 4,341,965 | 7/1982 | Okuo et al. | |

FOREIGN PATENT DOCUMENTS

| | | | |
|---|---|---|---|
| 107919 | 9/1984 | European Pat. Off. | 501/97 |
| 58-60676 | 4/1983 | Japan . | |
| 60-33263 | 2/1985 | Japan . | |
| 60-200863 | 10/1985 | Japan . | |
| 61-146754 | 7/1986 | Japan . | |
| 61-205678 | 9/1986 | Japan . | |
| 62-41773 | 2/1987 | Japan . | |
| 954285 | 4/1964 | United Kingdom | 501/95 |
| 2129788 | 5/1984 | United Kingdom . | |

OTHER PUBLICATIONS

"Microstructural Analysis of Defects and Interphases in $Si_3N_4$ Ceramics" Toru IMURA, published in *Approach to Atomic Structure High Resolution Transmission Electron* . . . (Supp. Ed. of Hitachi Instrument, News) pub. Mar., 1989.

"The System $Si_3N_4$—$SiO_2$—$Y_2O_3$", Gauckler, et al, published in Journal of the American Ceramics Society, vol. 63, No. 1-2, pp. 35-37, published Jan.-Feb. 1980.

"Review of Sialons and Related Nitrogen Ceramics" by K. H. Jack, published in *Journal of Materials Science* 11 (1976) pp. 1135-1158.

Primary Examiner—Brian E. Hearn
Assistant Examiner—Andrew Griffis
Attorney, Agent, or Firm—Antonelli, Terry & Wands

[57] ABSTRACT

Composite ceramic materials and a method of the same are disclosed, in which a ceramic material mainly containing silicon nitride, and at least one compound selected from a group consisting of nitrides, carbides, borides, silicides, oxides and oxynitrides of elements belonging to IIIa, IIIb, IVa, IBb, Va, VIa and VIII are combined to form a sintered body, and particles and whiskers of the ceramic material and compound are interlocked with each other and fixed so that the sintered body has a porosity of 5 to 30%. In the above composite ceramics, the particle of the compound are coupled with each other through the whisker or particle of the ceramic material. Accordingly, the composite ceramics are small in charge rate of size due to sintering, and are excellent in tenacity, heat resisting property and thermal shock resisting property. Further, the resistivity of the sintered body can be varied by changing the mixture ratio of ceramic material and compound.

27 Claims, 5 Drawing Sheets

COMPOSITE CERAMICS AND METHOD OF MAKING THE SAME

This application is a continuation of application Ser. No. 092,614, filed Sept. 3, 1987, now abandoned.

BACKGROUND OF THE INVENTION

The present invention relates to composite ceramics and a method of making the same. In particular, the present invention relates to composite ceramics which have a small size change caused by sintering and are suitable for forming parts of complicated shape, and a method of making the above composite ceramics.

Metal and ceramic heaters have hitherto been known, and the metal heater is made of such a material as nichrome or tantalum. However, nichrome and tantalum are low in heat resistance, and deteriorate when heated to 1000° C. or more. The ceramic heater which has been put to practical use, is made of silicon carbide, stabilized zirconia, lanthanum chromide, molybdenum silicide, or the like. These ceramic materials are relatively high in electric resistance, and negative in temperature coefficient of resistance. Accordingly, these materials readily make thermal runaway, and it is difficult to control the temperature of these materials. Further, the ceramic materials are low in mechanical strength and thermal shock resistance. Thus, novel conductive ceramics which can be used in place of the above ceramic materials, have been earnestly desired and widely investigated.

For example, a ceramic body disclosed in JP-A-60-103078, that is, a ceramic body formed in such a manner that a compound is mixed with SiC or $Si_3N_4$ and the mixture thus obtained is sintered by the hot press method, can eliminate the difficulties of the conventional ceramic materials. The hot press method can increase the density of sintered body, but requires a vast amount of energy. Thus, there arises a problem that the manufacturing cost the sintered body is increased.

Further, as disclosed in JP-A-60-60,983, a conductive ceramic body can be formed in such a manner that a conductive compound is mixed with $Si_3N_4$ and the mixture is sintered by a pressureless sintering method which is less in energy consumption than the hot press method. In this case, however, a sintering agent is added to the above mixture, and thus the sintered body is softened or deformed when heated to a high temperature. Further, the contraction due to sintering lies in a range from about 15% to about 18%, and the deformation due to sintering becomes a serious problem. When the sintering agent is omitted and the mixture of the conductive compound and $Si_3N_4$ powder is sintered without containing the sintering agent, the sintered body is low in density and large in resistivity, and hence cannot act as a conductive ceramic body.

As mentioned above, the above prior art pays no attention to the contraction due to sintering. That is, it is difficult to form a ceramic part which has a complicated shape and is readily subjected to deformation due to sintering, by the prior art. Further, a cost necessary for machining the sintered body to a desired shape is not low.

Reference may be made to JP-A-58-88169, JP-A-61-101465 and JP-A-61-146754.

SUMMARY OF THE INVENTION

An object of the present invention is to provide a composite ceramic material which has a small size change caused by sintering.

Another object of the present invention is to provide a composite ceramic material which have a high bending strength for a material obtained by sintering under atmospheric pressure.

Still another object of the present invention is to provide a composite ceramic material having a low electric resistivity.

Still another object of the present invention is to provide a composite ceramic material having a positive temperature coefficient of resistance.

Still another object of the present invention is to provide methods of producing the above-mentioned composite ceramic materials.

Still another object of the present invention is to provide a method of readily producing a composite ceramic material having a low electrical resistivity.

In order to attain the above objects, according to an aspect of the present invention, there is provided a sintered ceramic material comprising first particles of silicon nitride, second particles of at least one member selected from the group consisting of carbides, oxides, nitrides, borides, oxynitrides and silicides of elements belonging to IIIa, IIIb, IVa, IVb, Va, VIa and VIII of the Periodic Table, and whiskers of silicon nitride, wherein the second particles are interlocked with each other by means of the first particles and the whiskers, the sintered material having a porosity of 5 to 30%, and an amount of said whiskers being 1 to 70% by weight based on the sum of the first particles and the whiskers.

According to another aspect of the present invention, there is provided a sintered ceramic material comprising a substantial part of a matrix of particles of at least one compound selected from the group consisting of carbides, oxides, nitrides, borides, oxynitrides and silicides of elements belonging to IIIa, IIIb, IVa, IVb, Va, VIa and VIII of the Periodic Table, and a mixed phase of particles of silicon nitride and whiskers of silicon nitride wherein the particles of the compound are interlocked with each other by means of the particles and the whiskers of silicon nitride.

According to still another aspect of the present invention, there is provided a sintered ceramic material comprising a substantial part of a matrix of particles of at least one compound selected from the group consisting of carbides, oxides, nitrides, borides, oxynitrides and silicides of elements belonging to IIIa, IIIb, IVa, IVb, Va, VIa and VIII of the Periodic Table, and a mixed phase of particles of silicon nitride and whiskers of silicon nitride wherein the particles of the compound are interlocked with each other by means of the particles and the whiskers of silicon nitride, the compound containing at least one compound having a low electric resistivity.

According to still another aspect of the present invention, there is provided a sintered ceramic material comprising a substantial part of a matrix of particles of at least one compound selected from the group consisting of carbides, oxides, nitrides, borides, oxynitrides and silicides of elements belonging to IIIa, IIIb, IVa, IVb, Va, VIa and VIII of the Periodic Table, and a mixed phase of particles of silicon nitride and whiskers of silicon nitride wherein the particles of the compound are interlocked with each other by means of the particles and the whiskers of silicon nitride, the sintered ceramic material having a positive temperature coefficient of resistance.

According to still another aspect of the present invention, there is provided a sintered ceramic material comprising a substantial part of a matrix of particles of at least one compound selected from the group consisting of carbides, oxides, nitrides, borides, oxynitrides and silicides of elements belonging to IIIa, IIIb, IVa, IVb, Va, VIa and VIII of the Periodic Table, and a mixed phase of particles of silicon nitride and whiskers of silicon nitride wherein the particles of the compound are interlocked with each other by means of the particles and the whiskers of silicon nitride, the sintered ceramic material having a bending strength of at least 300 MN/m$^2$.

According to still another aspect of the present invention, there is provided a process for producing a sintered ceramic material, which comprises the steps of:

(1) preparing a molded article comprising a first powder of metallic silicon and/or ferrosilicon powder, a second powder of at least one compound selected from the group consisting of carbides, oxides, nitrides, borides, oxynitrides and silicides of elements belonging to IIIa, IIIb, IVa, IVb, Va, VIa and VIII of the Periodic Table, wherein the second powder contains at least one compound selected from the group having a low electric resistivity and a binder for forming the first and second powders into the article;

(2) subjecting the binder to decomposition so as to make the article porous so that gaseous substances can permeate into the pores of the article; and (3) sintering the porous article in a nitrogen atmosphere containing less than 50 ppm of oxygen at an elevated temperature of at least 1350° C., whereby nitrogen gas reacts with said silicon to form particles of silicon nitride and whiskers of silicon nitride in an amount of 1 to 70% by weight based on the sum of the particles and whiskers of the silicon nitride so as to interlock particles of the second powder.

According to further aspect of the present invention, there is provided a process for producing a sintered ceramic material, which comprises the steps of:

(1) preparing a molded article comprising a first powder of metallic silicon and/or ferrosilicon powder, a second powder having a particle size no greater than 100 microns on average and of at least one compound selected from the group consisting of carbides, oxides, nitrides, borides, oxynitrides and silicides of elements belonging to IIIa, IIIb, IVa, IVb, Va, VIa and VIII of the Periodic Table, and a binder for forming the first and second powders into the article;

(2) subjecting the binder to decomposition so as to make the article porous so that gaseous substances can permeate into the pores of the article; and (3) sintering the porous article in a nitrogen atmosphere containing less than 50 ppm of oxygen at an elevated temperature of at least 1350° C., whereby nitrogen gas reacts with the silicon to form particles of silicon nitride and whiskers of silicon nitride in an amount of 1 to 70% by weight based on the sum of the particles and whiskers of the silicon nitride so as to interlock particles of the second powder.

According to still further aspect of the present invention, there is provided a process for producing a sintered ceramic material, which comprises the steps of:

(1) preparing a molded article comprising a first powder of metallic silicon and/or ferrosilicon powder, a second powder of at least one compound selected from the group consisting of carbides, oxides, nitrides, borides, oxynitrides and silicides of elements belonging to IIIa, IIIb, IVa, IVb, Va, VIa and VIII of the Periodic Table, and an organic binder for forming the first and second powders into the article;

(2) subjecting the binder to decomposition so as to make the article porous so that gaseous substances can permeate into the pores of the article; and (3) sintering the porous article in a nitrogen atmosphere containing less than 50 ppm of oxygen at an elevated temperature of at least 1350° C., whereby nitrogen gas reacts with the silicon to form particles of silicon nitride and whiskers of silicon nitride in an amount of 1 to 70% by weight based on the sum of the particles and whiskers of the silicon nitride so as to interlock particles of the second powder.

In composite ceramics according to the present invention, particles of the compound are coupled with each other through the particle or whisker of silicon nitride which is produced from metallic silicon powder. Accordingly, the composite ceramics are small in change rate of size due to sintering, and excellent in tenacity, heat resisting property and thermal shock resisting property. Further, the resistivity of a sintered ceramic body according to the present invention can be varied within a range from $10^{16}$ to $10^{-5}$ Ωcm by changing the mixture ratio of ceramic material and conductive compound. Further, the sintered ceramic body can be processed by the electric discharge machining method.

DESCRIPTION OF THE PREFERRED EMBODIMENTS

Composite ceramic materials according to the present invention have a structure that particles are combined with each other through the whiskers or particles of Si$_3$N$_4$ made from metallic silicon. The particles used in the present invention are made of at least one material selected from the group consisting of oxides, oxynitrides, nitrides, carbides, borides and silicides of elements belonging to groups IIIa, IIIb, IVa, IVb, Va, VIa and VIII. The materials SiC, Si$_3$N$_4$, AlN, Al$_2$O$_3$, ZrO$_2$, Si$_2$O, TiO$_2$, SiO$_2$, BeO, MgO, Fe$_2$O$_3$, TiN, TiC, TiB$_2$, TiSi$_2$, ZrN, ZrC, ZrB$_2$, ZrSi$_2$, HfN, HfC, TaN, TaC, TaB$_2$, TaSi$_2$, Mo$_2$N, Mo$_2$C, MoB, Cr$_2$N, Cr$_3$C$_2$, CrB, $CrSi_2$, NbN, NbC, $NbSi_2$, VN, VC, WC and $WSi_2$ are mainly used for making the particles.

Specifically, the materials SiC, $Si_3N_4$, $Al_2O_3$, $ZrO_2$, TiN, TiC, ZrN, ZrC, $Cr_2N$ and $Cr_3C_2$ are excellent in oxidation resisting property and are suited to make the particles.

A sintered ceramic body according to the present invention contains 10 to 80% by volume compound. In the case where a conductive ceramic body is desired, when the conductive compound content is less than 30%, the ceramic body has a resistivity more than 10 $\Omega$cm, and is negative in temperature coefficient of resistance. Accordingly, in a case where the sintered ceramic body is required to be positive in temperature coefficient of resistance, it is desirable to make the conductive compound content not less than 30%. When the compound content exceeds 80%, the mechanical strength of the ceramic body is decreased, and the thermal-shock resisting property and oxidation resisting property of the ceramic body are deteriorated.

It is preferable that a sintered ceramic body according to the present invention has a porosity of 5 to 30%. When the porosity is smaller than 5%, it is difficult for nitrogen gas to flow through the sintered body, and thus a good sintered body cannot be obtained. In more detail, when a formed body made of the mixture of a compound and metallic silicon powder is sintered in a nitrogen atmosphere, the metallic silicon powder reacts with the nitrogen so that $Si_3N_4$ particles and whiskers are generated, and particles of the compound are combined with each other through the $Si_3N_4$ particles or whiskers. That is, the formed body is required to have pores for causing the nitrogen gas to flow through the formed body.

It is preferable that the mean diameter of the metallic silicon powder used in the present invention is not greater than 5 $\mu$m. When the mean diameter is greater than 5 $\mu$m, it takes a lot of time to transform the silicon powder into $Si_3N_4$, and a considerable amount of silicon powder is left unchanged.

According to the present invention, a formed body made of the mixture of a compound and metallic silicon contains a forming binder. The forming binder is at least one material selected from a group consisting of organic polymer compounds such as polyvinyl butyral and polyethylene, organosilicon polymer compounds such as a silicon-imide compound and a polysilane compound, a thermoplastic resin, and a lubricant such as stearic acid. An appropriate amount (for example, 2 to 20% by weight) of such a forming binder is added to the mixture of the metalic silicon and the compound.

According to the present invention, a formed body made of the raw mixture which contains metallic silicon, a compound and a forming binder is preferably heated to at least 1350° C. in a nitride producing gas which mainly contains nitrogen and/or ammonia. The nitride producing gas may further contain hydrogen, argon and helium, if necessary.

In the present invention, metallic silicon and a compound which are available on the market in the form of a particle or whisker, may be used as they are, or may be ground by a mill into rounded powder.

In a sintered ceramic body according to the present invention, a large number of needle-like whiskers produced from particles are interlocked with each other in empty spaces which are formed among particles. Thus, the sintered ceramic body is excellent in thermal-shock resisting property and large in mechanical strength.

In a sintered ceramic body according to the present invention, it is preferable that a ratio of the volume of $Si_3N_4$ whisker to the total volume of $Si_3N_4$ lies in a range from 1% to 70%, preferably a range from 10% to 30%. When the ratio is outside this range, the thermal-shock resisting property and tenacity of the sintered body are deteriorated.

In a case where a part which is not required to have high tenacity is to be formed by the present invention, it is unnecessary to generate the $Si_3N_4$ whisker.

According to the present invention, a body is formed of the raw mixture which contains metallic silicon, a compound and a forming binder, by one of the injection molding method, the cast molding method, the rubber pressing method, the extrusion molding method and the metal mold method, in accordance with the shape of the body and required characteristics. The formed body thus obtained is heated to remove the forming binder, and then subjected to the heat treatment for generating whiskers.

It is preferable that the formed body is sintered in a nitride producing gas or nitrogen, since the greater part of particles and whiskers generated from metallic silicon are made of $Si_3N_4$. If the formed body is sintered in an oxidizing gas, conductive compounds will be oxidized and the resistivity of the sintered body will be increased.

The oxygen concentration in the nitrogen gas is preferably less than 50 ppm or more preferably less than 10 ppm. The reason is as follows. That is, Si reacts with oxygen to produce SiO gas which in turn reacts with the nitrogen to produce $Si_3N_4$ whiskers on the external surface of the sintered body, with a result that the density of the sintered body can not be sufficiently raised, which is a problem.

In a case where silicides or borides are used as the compound, the silicides and borides react with nitrogen of the nitride producing gas. In this case, if the sintering time is inappropriate, cracks will be readily generated in the sintered body. Accordingly, it is preferable to use a nitride or carbide as the compound.

Further, resin or conductive particles may be introduced into the pores of the sintered body.

The raw mixture may further contain $Si_3N_4$ whiskers. In this case, when the raw mixture is sintered, the original $Si_3N_4$ whiskers are coupled with $Si_3N_4$ particles or whiskers which are produced from the metallic silicon. Thus, the characteristics of the sintered body are not affected by the original whiskers.

A sintered ceramic body may be again sintered (namely, resintered) to make the porosity thereof smaller than 5%. The resintering (namely, secondary sintering) can be carried out by one of the hot press method, the hydrostatic hot press method and the presureless sintering method using a sintering agent. The resintered body contains whiskers which are three-dimensionally arranged, and thus is very high in tenacity. In this case, the change in size due to resintering can be made less than 7%, and thus the resintered body having accurate dimensions can be obtained. In a case where the hot press method and the hydrostatic hot press method are used, it is preferable that a pressure for resintering is applied to the sintered body, after the sintered body has been heated to such an extent that whiskers can make plastic deformation.

A sintered ceramic body obtained by using a sintering agent becomes low in mechanical strength when heated to a high temperature, since the sintering agent is softened at the high temperature. Further, such a sintered ceramic body cannot have favorable electrical characteristics, since a high resistance layer is formed at grain boundaries. In a sintered ceramic body according to the present invention, however, the quantity of sintering agent is far smaller than that in a conventional sintered ceramic body. Accordingly, the sintered ceramic body according to the present invention is small in change in size due to sintering, and is scarcely deformed by sintering.

When a body is formed of the mixture of metallic silicon and a conductive compound, it is preferable that the mixture contains a certain amount (for example, 2-20% by weight) organic binder When a sintered ceramic body according to the present invention is made, ferrosilicon may be used in place of metallic silicon. In this case, it is preferable that the iron content of ferrosilicon is not greater than 70% by weight. The reason for this is as follows. The reaction of silicon with nitrogen is promoted by iron. However, when the iron content of ferrosilicon is large, a considerable amount of ferrosilicon is left in a sintered ceramic body as it is, and the residual ferrosilicon deteriorates the high temperature characteristics of the sintered ceramic body.

It is preferable that the compound used in the present invention is constituted of particles having a mean diameter of 100 $\mu$m or less and/or whiskers having an aspect ratio of 200 or less and a mean length of 200 $\mu$m or less. When the mean diameter, mean aspect ratio and mean length exceed 100 $\mu$m, 200 and 200 $\mu$m, respectively, the distribution of particles and whiskers becomes nonuniform, and thus the bending strength and thermal-shock resistance of a sintered ceramic body are decreased.

As has been explained in the above, composite ceramic materials according to the present invention have a small size change caused by sintering, and can have, if desired, a resistivity of $10^{16}$ to $10^{-5}$ $\Omega$cm by changing the conductive compound content of raw material. Further, the conductive composite ceramic materials are positive in temperature coefficient of resistance, and hence there is not any fear of causing thermal runaway. Moreover, the composite ceramic materials are excellent in thermal shock resisting property.

Thus, composite ceramic materials according to the present invention are suitable for use in various kinds of heaters, the heater for glow plug, a fuel gas burning lighter, a kerosene vaporizing burner, the slip members of electric generator, the brush of electric motor, and others.

Further, composite ceramic materials according to the present invention are applicable to parts which are used in an engine, an aeronautical field, space technology, the steel industry and the oceanic development, and are required to be high in tenacity, mechanical strength, heat resistance and electric conductivity.

Figure 9:
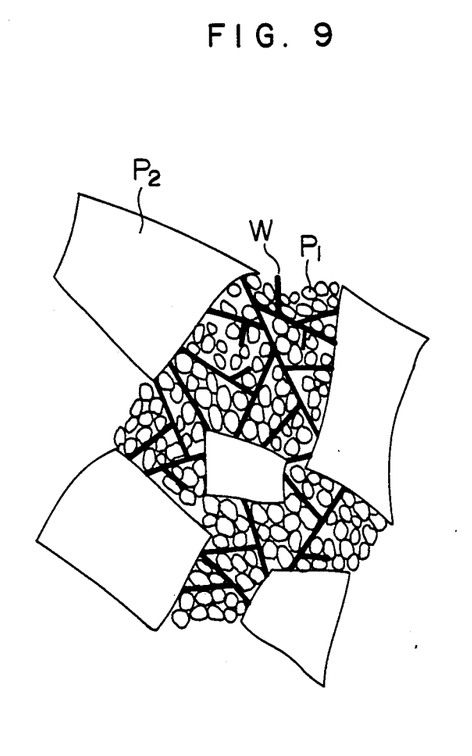
FIG. 9 is a view schematically showing the structure of a sintered body according to the present invention.

FIG. 9 schematically shows the structure of a sintered body according to the present invention. As shown in the figure, in the sintered bodies of the invention there are formed particles (first particles) $P_1$ of $Si_3N_4$ formed from metallic silicon (Si) and many whiskers W of $Si_3N_4$ formed also from metallic silicon with the whiskers tied or interlocked with each other, thereby interlocking particles (second particles) $P_2$, which contributes a great deal to produce a high thermal shock resisting property and a high tenacity of the sintered body. In the present invention, the amount of the whiskers in the sintered body is specified as 1 to 70 vol % preferably 10 to 30 vol %) with respect to 100 vol % of $Si_3N_4$ phase. The reason is that sufficient thermal shock resisting property and tenacity are not obtained outside this range. It is a matter of course, however, that the amount is not required to be in this range if such properties are not a great concern.

The following examples explain the present invention in greater detail. However, the present invention is not intended to be limited to the particular examples, since many changes and modifications of the invention are possible in the light of the teachings of the invention.

EXAMPLES 1 to 6

Metallic silicon powder having a mean diameter of 0.7 $\mu$m (namely, Hi-Si-No. 600S manufactured by Yamaishi Kinzoku K.K.) and TiN powder having a mean diameter of 0.5 $\mu$m (namely, Ti-N-01 manufactured by JAPAN NEW METALS CO., LTD.) were mixed in mixture ratios shown in the Table 1 mentioned later, and further 100 parts by weight of each mixture, 9 parts by weight of polyvinyl alcohol powder and 50 CC of methanol subjected to mixing for 24 hours. Each of the mixtures thus obtained was formed into a rod having a diameter of 40 mm and a length of 10 mm under a pressure of 1,000 kgf/cm². The formed bodies were heated to 500° C. at a rate of 2.5° C./h in the atmosphere of nitrogen. After the polyvinyl alcohol had been decomposed, the formed bodies were heated to 1,100° C. at a rate of 5° C./min, and further heated to 1,400° C. at a rate of 4° C./h. In the sintered bodies thus obtained, a ratio of the volume of $Si_3N_4$ whisker to the volume of $Si_3N_4$ particle was 1/9. It was possible to change the above ratio by varying the temperature increasing rate between 1,100° C. and 1,400° C., or by maintaining the sintered bodies for a time at each of a plurality of temperatures between 1,100° C. and 1,400° C. Further, the above ratio was measured on the basis of the observation using a scanning electron microscope and the observation using a transmission electron microscope.

The characteristics of the above sintered bodies are shown in the Table 1. Further, for the purpose of comparison, rods having the same dimensions as mentioned above were formed of the mixtures of $Si_3N_4$ powder having a mean diameter of 0.8 $\mu$m and TiN power having a mean diameter of 0.5 $\mu$m, and the rods were sintered at 1,750° C. for 4 hours in the atmosphere of nitrogen. The characteristics of the sintered bodies (namely, reference examples 1 to 6) thus obtained are also shown in the Table 1.

In the Table 1, the term "thermal-shock resisting value" indicates the number of repetitions of a quenching operation for rapidly cooling a sintered body in water after the sintered body has been maintained at 1,200° C. for 30 minutes. The quenching operation is repeated till a crack is generated in the sintered body.

Figure 1:
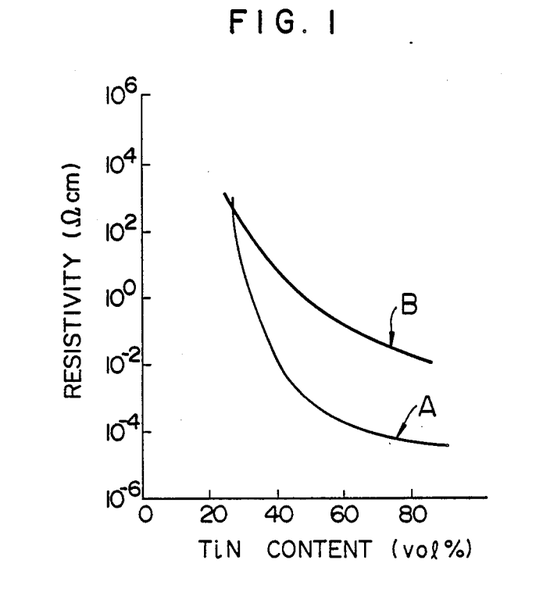
FIG. 1 is a graph showing relations between TiN content and resistivity.

FIG. 1 shows relations between the TiN content and the resistivity of sintered bodies. In FIG. 1, a curve A indicates the above relation of the examples 1 to 6 according to the present invention, and a curve B that of the reference examples 1 to 6. As shown in FIG. 1, the resistivity of each of the examples 1 to 6 is one tenth to one hundredth the resistivity of a corresponding one of the reference examples 1 to 6. Further, each of the examples 1 to 6 is superior in bending strength and thermal shock resisting value to a corresponding one of the reference examples 1 to 6.

Further, raw materials having compositions shown in the following Table 2 were prepared. Each of the raw materials contained $Y_2O_3$ as a sintering agent. Each raw material was formed into a rod having the same dimensions as mentioned above, and then sintered at 1,750° C. for 4 hours. The characteristics of the sintered bodies thus obtained (namely, reference examples 7 to 12) are shown in the Table 2.

1,100° C. to 1,400° C. at a rate of 4° C./h. A large number of sintered bodies were made in the above-mentioned manner.

The $Si_3N_4$-TiC composite ceramic bodies thus obtained had a relative density more than 80%. The relation between the TiC content and the resistivity of the composite ceramic bodies is indicated by a cruve E in FIG. 3. A composite ceramic body having a resistivity

TABLE 1

| | | raw material (wt %) | | composition of sintered body (vol %) | | | resistivity at 20° C. ($\Omega$cm) | bending strength at 1,200° C. (MN/m$^2$) | thermal shock resisting value (number of repetitions) |
|---|---|---|---|---|---|---|---|---|---|
| | | Si | TiN | $Si_3N_4$ | Tin | $Si_3N_4$ whisker | | | |
| Example No. | 1 | 82 Si 50.7 | 49.3 | 63 | 30 | 7 | $2.8 \times 10^0$ | 384 | 47 |
| | 2 | 39.8 | 60.2 | 54 | 40 | 6 | $2.2 \times 10^{-2}$ | 351 | 48 |
| | 3 | 30.6 | 69.4 | 45 | 50 | 5 | $3.5 \times 10^{-3}$ | 332 | 48 |
| | 4 | 22.7 | 77.3 | 36 | 60 | 4 | $5.5 \times 10^{-4}$ | 303 | 50 |
| | 5 | 15.9 | 84.1 | 27 | 70 | 3 | $4.1 \times 10^{-4}$ | 241 | 42 |
| | 6 | 9.9 | 90.1 | 18 | 80 | 2 | $2.1 \times 10^{-4}$ | 225 | 40 |
| reference example No. | 1 | $Si_3N_4$ 57.9 | 42.1 | 70 | 30 | — | $6.2 \times 10^1$ | 244 | 21 |
| | 2 | $Si_3N_4$ 46.9 | 53.1 | 60 | 40 | — | $4.6 \times 10^0$ | 245 | 22 |
| | 3 | $Si_3N_4$ 37 | 63 | 50 | 50 | — | $1.1 \times 10^0$ | 233 | 22 |
| | 4 | $Si_3N_4$ 28 | 72 | 40 | 60 | — | $6.8 \times 10^{-1}$ | 222 | 19 |
| | 5 | $Si_3N_4$ 20.1 | 79.9 | 30 | 70 | — | $8.2 \times 10^{-2}$ | 201 | 19 |
| | 6 | $Si_3N_4$ 12.8 | 87.2 | 20 | 80 | — | $2.3 \times 10^{-2}$ | 187 | 17 |

TABLE 2

| | | composition (vol %) | | | resistivity at 20° C. ($\Omega \cdot$ cm) | bending strength (MN/m$^2$) | | thermal shock resisting value (number of repetitions) |
|---|---|---|---|---|---|---|---|---|
| | | $Si_3N_4$ | $Y_2O_3$ | TiN | | room temperature | 1200° C. | |
| reference example No. | 7 | 63 | 7 | 30 | $7.2 \times 10^{-2}$ | 543 | 312 | 21 |
| | 8 | 54 | 6 | 40 | $5.5 \times 10^{-3}$ | 518 | 271 | 21 |
| | 9 | 45 | 5 | 50 | $1.1 \times 10^{-3}$ | 462 | 225 | 18 |
| | 10 | 36 | 4 | 60 | $8.3 \times 10^{-4}$ | 381 | 211 | 17 |
| | 11 | 27 | 3 | 70 | $9.8 \times 10^{-4}$ | 348 | 148 | 15 |
| | 12 | 18 | 2 | 80 | $2.7 \times 10^{-3}$ | 311 | 127 | 15 |

Figure 2:
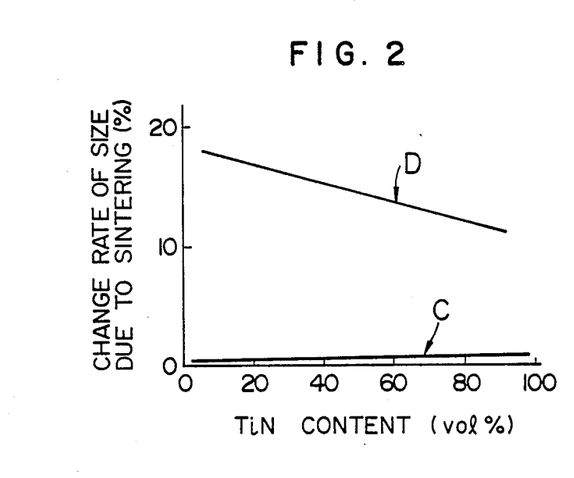
FIG. 2 is a graph showing relations between TiN content and change rate of size due to sintering.

FIG. 2 shows relations between the TiN content and the change rate of size due to sintering. In FIG. 2, a line C indicates the above relation of sintered bodies according to the present invention, and a line D indicates that of sintered bodies using the sintering agent $Y_2O_3$. As shown in FIG. 2, the sintered bodies according to the present invention are far smaller in change rate of size due to sintering than the sintered bodies using the sintering agent. Further, when the sintering agent was used, a glass phase was formed in the sintered bodies, and the mechanical strength of the sintered bodies was reduced at a high temperature, since the glass phase was softened at the high temperature.

EXAMPLE 7

Metallic silicon powder having a mean diameter of 0.9 μm and TiC powder having a mean diameter of 2 μm were mixed in various mixture ratios, and 100 parts by weight of each mixture and 11 parts by weight of polyethylene wax were kneaded by a dispersion kneader at 150° C. for five hours. The mixture thus obtained was cracked to pieces, and then formed into a desired shape at 150° C. under a pressure of 1,000 kgf/cm$^2$. The formed body was heated to 500° C. at a rate of 2° C./h to remove the wax, and then heated from 1,100° C. to 1,400° C. at a rate of 4° C./h. A large number of sintered bodies were made in the above-mentioned manner.

Figure 3:
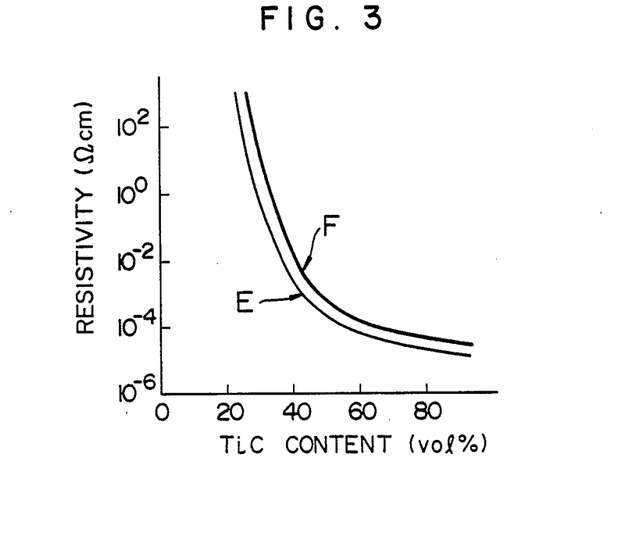
FIG. 3 is a graph showing relations between TiC content and resistivity.
Figure 4:
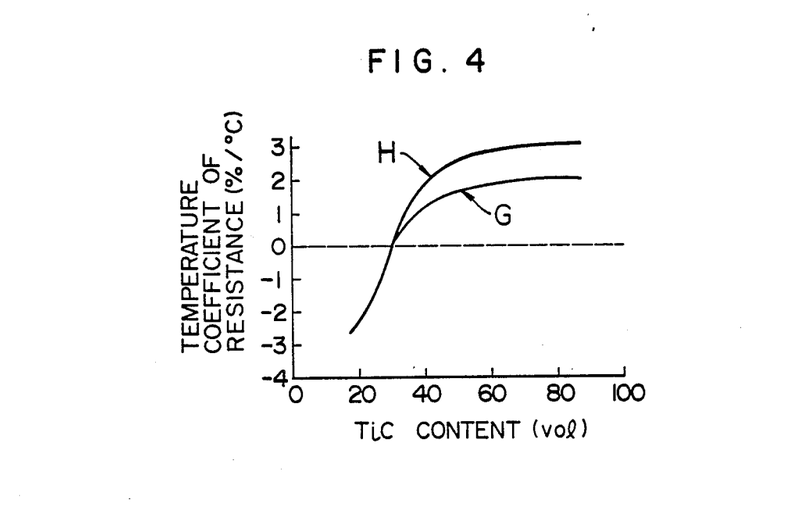
FIG. 4 is a graph showing relations between TiC content and temperature coefficient of resistance.
Figure 5:
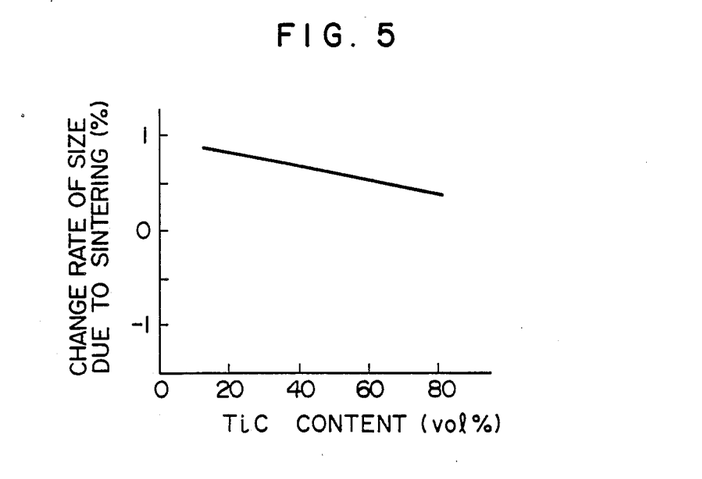
FIG. 5 is a graph showing a relation between TiC content and change rate of size due to sintering.

$10^{16}$ to $10^{-5}$ was obtained by selecting the TiC content appropriately. Further, the relation between the TiC content and the temperature coefficient of resistance of the above-mentioned composite ceramic bodies is indicated by a curve G in FIG. 4. As can be seen from the curve G, composite ceramic bodies whose TiC content is greater than 30% by volume, are positive in temperature coefficient of resistance. Further, the relation between the TiC content and the change rate of size due to sintering for the $Si_3N_4$-TiC composite ceramic bodies is shown in FIG. 5. It is known from FIG. 5 that the change rate of size due to sintering in the above composite ceramic bodies is smaller than the change rate of size due to sintering at atmospheric pressure (that is, 15 to 18%) by about one order of magnitude.

EXAMPLE 8

Composite ceramic bodies were made in the same manner as in the EXAMPLE 7, except that $ZrB_2$ powder, ZrC powder and ZrN powder each having a mean diameter of 2 μm were used in place of the TiC powder. Thus, $Si_3N_4$-$ZrB_2$ composite ceramics, $Si_3N_4$-ZrC composite ceramics and $Si_3N_4$-ZrN composite ceramics were made. The resistivity of these composite ceramics varied with the conductive compound content in accordance with the curve E of FIG. 3. Further, similarly to the Si$_3$N$_4$-TiC composite ceramics in the EXAMPLE 7, the Si$_3$N$_4$-ZrB$_2$ composite ceramics, the Si$_3$N$_4$-ZrC composite ceramics and the Si$_3$N$_4$-ZrN composite ceramics were positive in temperature coefficient of resistance, when the conductive compound content (namely, ZrB$_2$, ZrC or ZrN content) was not less than 30% by volume.

EXAMPLE 9

Composite ceramic bodies were made in the same manner as in the EXAMPLE 7, except that TiC was replaced by one of conductive compounds TiB$_2$, Cr$_2$N, Cr$_3$C$_2$, CrB, HfN, HfC, TaN, TaC, TaB$_2$, Mo$_2$N, Mo$_2$C, MoB, NbN, NbC, NbB$_2$, WC, W$_2$C, TiB, VN, WSi$_2$, TiSi$_2$, ZrSi$_2$, NbSi$_2$, TaSi$_2$, CrSi$_2$, MoSi$_2$, VC, Fe$_3$C, ThC, CeC$_2$ and Cr$_7$C$_2$. Each of these conductive compounds was formed of powder having a mean diameter of 2 μm. In all the composite ceramic bodies thus obtained, the change rate of size due to sintering was not greater than 1%. Further, the resistivity of the composite ceramic bodies varies with the conductive compound content in accordance with a curve F shown in FIG. 3.

EXAMPLE 10

Metallic silicon powder having a mean diameter of 1.2 μm and corresponding to 50 parts by volume of Si$_3$N$_4$ and 50 parts by volume of TiC whiskers having a mean aspect ratio of 50 and a mean length of 100 μm were mixed. Further, 100 parts by weight of the above mixture and 10 parts by weight of a polysilane compound were mixed. The mixture thus obtained was formed in a desired shape under a pressure of 1,000 kgf/cm$^2$, and the formed body was heated stepwise to 1,700° C. in the atmosphere of nitrogen, to be sintered.

The composite ceramic body thus obtained, had a relative density of 93%, a resistivity of $4 \times 10^{-3}$ Ωcm (at room temperature) and a bending strength of 380 MN/m$^2$. Further, the temperature coefficient of resistance of the composite ceramic body was +2.2%/°C. in a temperature range from 20° C. to 500° C., and the change rate of size due to sintering in the composite ceramic body was +1.8%.

EXAMPLES 11 to 18

Several composite ceramic bodies were made by changing the mean diameter of metallic silicon powder in the manufacturing process of the EXAMPLE 10. The characteristics of the composite ceramic bodies thus obtained are shown in the following Table 3.

TABLE 3

|  |  | mean diameter of metallic Si powder (μm) | bending strength at 1200° C. (MN/m$^2$) | resistivity at room temperature (Ωcm) | temperature coefficient of resistance at 20 to 500° C. (%/°C.) | change rate of size due to sintering (%) |
|---|---|---|---|---|---|---|
| example No. | 11 | 0.5 | 390 | $4 \times 10^{-3}$ | +2.4 | 1.9 |
|  | 12 | 0.9 | 390 | $4 \times 10^{-3}$ | +2.3 | 1.8 |
|  | 13 | 1.2 | 380 | $4 \times 10^{-3}$ | +2.2 | 1.8 |
|  | 14 | 2.7 | 380 | $4 \times 10^{-3}$ | +2.2 | 1.8 |
|  | 15 | 4.2 | 370 | $4 \times 10^{-3}$ | +2.2 | 1.8 |
|  | 16 | 4.9 | 360 | $5 \times 10^{-3}$ | +2.1 | 1.8 |
|  | 17 | 6.2 | 210 | $2 \times 10^{-2}$ | +1.8 | 1.6 |
|  | 18 | 9.1 | 180 | $6 \times 10^{-2}$ | +1.5 | 1.6 |

Figure 6:
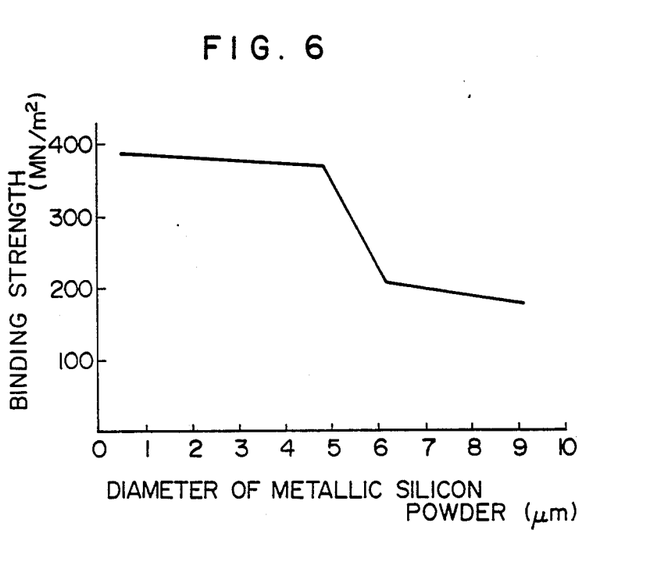
FIG. 6 is a graph showing a relation between the diameter of metallic silicon powder for producing Si$_3$N$_4$ and bending strength.

FIG. 6 shows a relation between the bending strength of the above composite ceramic bodies and the mean diameter of metallic silicon powder used. When the mean diameter of metallic silicon powder exceedes 5 μm, part of silicon is left in a sintered body without being converted into silicon nitride. The residual silicon vaporizes when heated to a high temperature. Thus, the density and mechanical strength of the sintered body are reduced, and the resistivity thereof is increased.

EXAMPLES 19 to 27

64.9 parts by weight of TiN powder having a mean diameter of 2 μm were mixed with 30.6 parts by weight of metallic silicon powder having a mean diameter of 0.9 μm. The mixture thus obtained was used for making formed bodies in the same manner as in the EXAMPLE 7. The formed bodies were heated to 1,400° C. at different temperature increasing rates in the atmosphere of nitrogen so that the sintered bodies thus obtained contained different volumes of Si$_3$N$_4$ whisker. The characteristics of the sintered bodies are shown in the following Table 4. The tenacity at destruction mentioned in the Table 4 was measured by the notched beam method.

TABLE 4

|  |  | composition (vol %) | | | resitivity at room temperature (Ωcm) | bending strength at 1200° C. (MN/m$^2$) | thermal shock resisting value (number of repetitions) | tenacity at destruction (MN/m$^{3/2}$) | porosity (%) |
|---|---|---|---|---|---|---|---|---|---|
|  |  | Si$_3$N$_4$ | TiN | Si$_3$N$_4$ whisker |  |  |  |  |  |
| example No. | 19 | 49.5 | 50 | 0.5 | $3.5 \times 10^{-3}$ | 335 | 45 | 5 | 13 |
|  | 20 | 40 | 50 | 10 | $3.5 \times 10^{-3}$ | 332 | 47 | 6 | 13 |
|  | 21 | 30 | 50 | 20 | $3.5 \times 10^{-3}$ | 328 | 50 | 7 | 13 |
|  | 22 | 20 | 50 | 30 | $3.5 \times 10^{-3}$ | 325 | 52 | 7 | 14 |
|  | 23 | 15 | 50 | 35 | $3.5 \times 10^{-3}$ | 321 | 49 | 5 | 14 |
|  | 24 | 49.5 | 50 | 0.3 | $3.5 \times 10^{-3}$ | 339 | 38 | 3 | 13 |
|  | 25 | 10 | 50 | 40 | $3.5 \times 10^{-3}$ | 254 | 33 | 4 | 14 |
|  | 26 | 45 | 50 | 5 | $3.5 \times 10^{-3}$ | 333 | 47 | 6 | 13 |
|  | 27 | 35 | 50 | 15 | $3.5 \times 10^{-3}$ | 331 | 53 | 8 | 13 |

As can be seen from the Table 4, sintered bodies, in which the ratio of the volume of Si$_3$N$_4$ whisker to the total volume of Si$_3$N$_4$ lies in a range from 0.01 to 0.7, are excellent in thermal shock resisting property and tenacity.

EXAMPLES 28 to 47

Twenty sintered bodies were made in the same manner as in the EXAMPLE 1, by using twenty kinds of nitride, carbide and boride of elements belonging to groups IVa, Va and VIa as the conductive compound. The oxidation test was carried out for the above sintered bodies. The results of the test are shown in the following Table 5. As is apparent from the Table 5, sintered bodies using TiN, TiC, ZrN, ZrC, $Cr_2N$ and $Cr_3C_2$ are especially excellent in oxidation resisting property.

TABLE 5

| example No. | composition of sintered body | | increase in quantity due to oxidation in air at 1,200° C. for 50 hours (mg/cm$^2$) |
|---|---|---|---|
| 28 | $Si_3N_4$ 50 vol % | TiN 50 vol % | 2.2 |
| 29 | " | TiC 50 vol % | 1.8 |
| 30 | " | ZrN 50 vol % | 2.4 |
| 31 | " | ZrC 50 vol % | 1.9 |
| 32 | " | $Cr_2N$ 50 vol % | 2.1 |
| 33 | " | $Cr_3C_2$ 50 vol % | 1.5 |
| 34 | " | $ZrB_2$ 50 vol % | 8.2 |
| 35 | " | HfN 50 vol % | 12.5 |
| 36 | " | HfC 50 vol % | 10.1 |
| 37 | " | TaN 50 vol % | 10.8 |
| 38 | " | TaC 50 vol % | 8.4 |
| 39 | " | $TaB_2$ 50 vol % | 15.2 |
| 40 | " | $Mo_2N$ 50 vol % | 7.5 |
| 41 | " | $Mo_2C$ 50 vol % | 5.6 |
| 42 | " | MoB 50 vol % | 14.2 |
| 43 | " | CrB 50 vol % | 12.5 |
| 44 | " | NbN 50 vol % | 12.5 |
| 45 | " | NbC 50 vol % | 11.5 |
| 46 | " | $NbB_2$ 50 vol % | 16.3 |
| 47 | " | $TiB_2$ 50 vol % | 14.7 |

EXAMPLE 48

The collector members of an A.C. generator for use in automobile were formed of the $Si_3N_4$-TiC ceramic body obtained in the EXAMPLE 7, and the characteristics of the collector members were studied. The results of the study are shown in the following Table 6. As is apparent from the Table 6, the present collector members are superior in abrasion resisting property to conventional collector members (that is, reference example 13) made of copper and carbon.

TABLE 6

| | | example 48 | reference example 13 |
|---|---|---|---|
| slip ring | | $Si_3N_4$—TiC (50 vol %) | copper |
| slip | | $Si_3N_4$—TiC (50 vol %) | carbon |
| coefficient of friction | | 0.25 | 0.20 |
| state of slip plane | slip slip ring | flawless no change | flawed colored in dark brown |
| wear and | slip | nearly equal to | 0.8 μm |

TABLE 6-continued

| | | example 48 | reference example 13 |
|---|---|---|---|
| tear | slip ring | zero 1 to 4 μm | 10 to 20 μm |
| presence or absence of spark | | absent | absent |

*Test condition: 30,000 r.p.m.
Slip Current Density: 70 A/cm$^2$

EXAMPLE 49

Figure 7A:
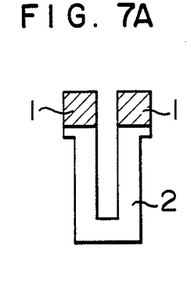
FIGS. 7A and 7B are plan and sectional views showing an example of a heater according to the present invention, respectively.
Figure 7B:
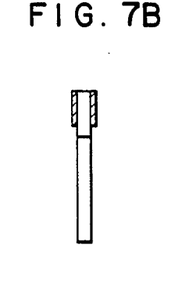
Figure 8:
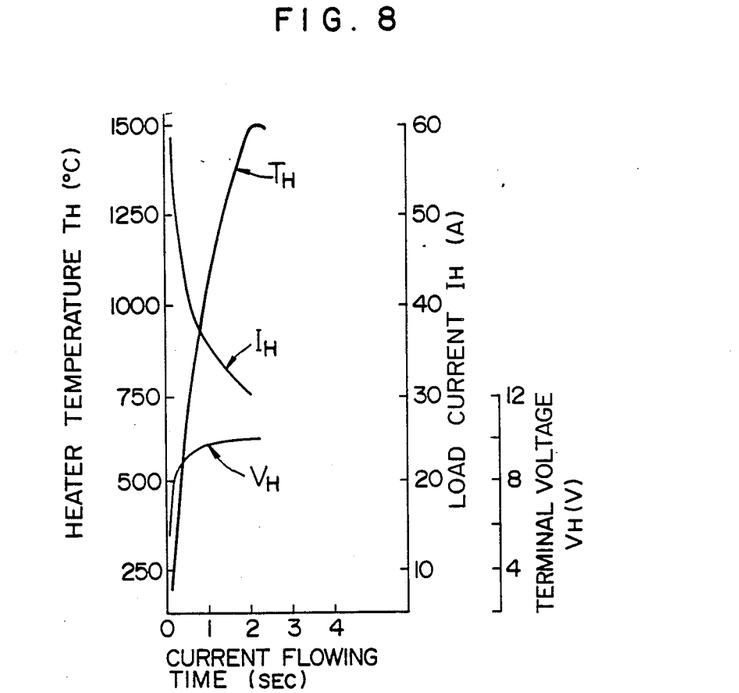
FIG. 8 is a graph showing characteristics of the heater of FIGS. 7A and 7B.

A U-shaped heater having a resistance value of 0.1 Ω and a resistivity of $6 \times 10^{-3}$ Ωcm was formed of the conductive ceramics obtained in the EXAMPLE 10. FIGS. 7A and 7B are the plan and sectional views of the heater, respectively. When a D.C. voltage of 12 V was applied between terminals 1 of the heater 2, the terminal voltage $V_H$ of the heater, the current $I_H$ flowing through the heater and the temperature $T_H$ of the tip of the heater varied with time as shown in FIG. 8. As shown in FIG. 8, the tip temperature $T_H$ was increased to 900° C. in about 0.8 sec., to 1,200° C. in about 1.2 sec., and to 1,500° C. in about 1.8 sec. That is, the tip temperature was rapidly increased. Further, the current $I_H$ decreased with increasing temperature. This means that the heater is positive in temperature coefficient of resistance. Thus, the melt down of heater due to thermal runaway will never occur.

EXAMPLES 50 to 58

Formed bodies were made in the same manner as in the EXAMPLE 1, and were sintered in various nitride-producing gases which were different in partial pressure of oxygen from each other. The composition and resistivity of the sintered bodies thus obtained are shown in the following Table 7. As is apparent from the Table 7, the resistivity increases, as the sum of $Si_2N_2O$ content and $SiO_2$ content is larger.

TABLE 7

| | | composition of sintered body (vol %) | | | | resistivity (Ωcm) |
|---|---|---|---|---|---|---|
| | | $Si_3N_4$ | $Si_2N_2O$ | $SiO_2$ | TiN | |
| example No. | 50 | 63 | 7 | 0 | 30 | $2.7 \times 10^0$ |
| | 51 | 40 | 20 | 0 | 30 | $5 \times 10^0$ |
| | 52 | 30 | 20 | 10 | 30 | $2 \times 10^1$ |
| | 53 | 15 | 35 | 10 | 30 | $3 \times 10^1$ |
| | 54 | 5 | 60 | 5 | 30 | $4 \times 10^1$ |

As seen from Table 7, the resistivity increases with the increase in amount of $Si_2N_2O$ and $SiO_2$.

EXAMPLES 55 to 60

Sintered bodies were made in the same manner as in the EXAMPLE 4, except that ferrosilicon powder having a mean diameter of 5 μm was used in place of metallic silicon powder and the iron content of the ferrosilicon powder was varied. The characteristics of the sintered bodies are shown in the following Table 8.

TABLE 8

| | | composition of raw material (wt %) | | | resistivity at room temperature (Ωcm) | bending strength (MN/m$^2$) | | thermal shock resisting value (number of repetitions) |
|---|---|---|---|---|---|---|---|---|
| | | ferrosilicon | | | | | | |
| | | Fe | Si | TiN | | room temp. | 1,200° C. | |
| example No. | 55 | 1.2 | 21.5 | 77.3 | $5.5 \times 10^{-4}$ | 310 | 310 | 50 |
| | 56 | 2.3 | 20.4 | 77.3 | $4.2 \times 10^{-4}$ | 310 | 305 | 49 |
| | 57 | 9.1 | 13.6 | 77.3 | $2.2 \times 10^{-4}$ | 315 | 283 | 46 |
| | 58 | 11.4 | 11.3 | 77.3 | $9.5 \times 10^{-5}$ | 317 | 273 | 45 |

TABLE 8-continued

| | composition of raw material (wt %) | | | resistivity at room temperature ($\Omega$cm) | bending strength (MN/m$^2$) | | thermal shock resisting value (number of repetitions) |
|---|---|---|---|---|---|---|---|
| | ferrosilicon | | TiN | | room temp. | 1,200° C. | |
| | Fe | Si | | | | | |
| 59 | 15.9 | 6.8 | 77.3 | $7.2 \times 10^{-5}$ | 316 | 265 | 40 |
| 60 | 18.2 | 4.5 | 77.3 | $4.2 \times 10^{-5}$ | 310 | 231 | 33 |

It is known from the table 8 that the bending strength at high temperature, the thermal shock resisting value and the resistivity decrease, as the iron content of raw material is larger.

EXAMPLE 61

The sintered body obtained in the EXAMPLE 10 was cut into a ring for sliding test having an outer diameter of 30 mm, an inner diameter of 20 mm and a thickness of 8 mm. The sliding surface of the ring was ground with a buff having 3-$\mu$m diamond powder thereon, and then a dry sliding test was made for the ring under the following conditions.

| Test conditions | |
|---|---|
| Kind of test: | mechanical seal type (ring on ring method) |
| Lubrication: | no lubricant |
| Sliding speed: | 10 m/min |
| Pressure at sliding surface: | 1.5 kgf/cm$^2$ |
| Time: | 48 hours |

The results of the test are shown in the following Table 9.

TABLE 9

| | material | dynamic co-efficient of friction | amount of wear generated for 48 hours ($\times 10^{-8}$ mm$^2$/kg) |
|---|---|---|---|
| example No. | 62 sintered body in example 10 | 0.10 | 8 |

Further, reference rings for comparison were made, and subjected to the same test as mentioned above. The results of the test are shown in the following Table 10.

TABLE 10

| | | material | dynamic co-efficient of friction | amount of wear generated for 48 hours ($\times 10^{-8}$ mm$^2$/kg) |
|---|---|---|---|---|
| reference example No. | 13 | Al$_2$O$_3$ | 0.85 | 41 |
| | 14 | Si$_3$N$_4$ | 0.9 | 52 |
| | 15 | SiC | 0.21 | 17 |
| | 16 | WC + Co alloy | seizure | — |
| | 17 | ZrO$_2$ | 0.52 | 27 |

It is known from the Tables 9 and 10 that the ring according to the present invention is superior in abraison resisting property to the reference rings, and is suited to be used as a sliding member. Thus, the sintered body obtained in the EXAMPLE 10 is applicable to a general-purpose mechanical seal ring, a chemical seal ring, a plunger, a bearing, a sand blast nozzle, a tappet, and others.

Further, the pores of the above sintered body may be filled with a lubricant.

EXAMPLES 63 to 69

Sintered bodies were made in the same manner as in the EXAMPLE 3, but the amount of forming binder were changed to make the sintered bodies different in porosity from each other. The characteristics of the sintered bodies are shown in the following Table 11.

TABLE 11

| | | composition of sintered body (vol %) | | porosity (%) | bending strength (MN/m$^2$) | increase in quantity due to oxidation at 1,000° C. for 50 hours (mg/cm$^2$) | tenacity at destruction (MN/m$^{3/2}$) |
|---|---|---|---|---|---|---|---|
| | | Si$_3$N$_4$ | TiN | | | | |
| example No. | 63 | 50 | 50 | 5 | 510 | 1.1 | 8 |
| | 64 | 50 | 50 | 10 | 480 | 1.5 | 8 |
| | 65 | 50 | 50 | 20 | 440 | 2.9 | 8 |
| | 66 | 50 | 50 | 25 | 390 | 3.9 | 7 |
| | 67 | 50 | 50 | 30 | 310 | 7.2 | 6 |
| | 68 | 50 | 50 | 35 | 240 | 18.2 | 3 |
| | 69 | 50 | 50 | 50 | 140 | 42.1 | 2 |

It is known from the Table 11 that when the porosity is made greater than 30%, the bending strength, tenacity and oxidation resisting property are greatly lowered.

EXAMPLES 70 to 74

The sintered bodies obtained in the EXAMPLES 19 to 23 were further subjected to HIP processing (namely, hot isostatic press processing) in the atmosphere of nitrogen for 150 minutes under conditions shown in the following Table 12. The characteristics of the sintered bodies thus processed are also shown in the Table 12.

TABLE 12

| | | HIP conditions | composition of sintered body (vol %) | | | porosity (%) | bending strength (MN/m$^2$) | | tenacity at destruction (MN/m$^{3/2}$) |
|---|---|---|---|---|---|---|---|---|---|
| | | | Si$_3$N$_4$ | TiN | Si$_3$N$_4$ whisker | | room temp. | 1,200° C. | |
| example No. | 70 | 2,000° C., a pressure of 100 atm | 49.5 | 50 | 0.5 | 0 | 985 | 990 | 13 |
| | 71 | 2,400° C., a pressure of 20 atm | 40 | 50 | 10 | 0 | 980 | 988 | 17 |
| | 72 | 1,900° C., a pressure of 1,000 atm | 30 | 50 | 20 | 0 | 982 | 985 | 17 |
| | 73 | 2,200° C., a pressure of 2,000 atm | 20 | 50 | 30 | 0 | 975 | 985 | 17 |
| | 74 | 2,400° C., a pressure of 3,500 atm | 15 | 50 | 35 | 1 | 903 | 912 | 15 |

It is known from the table 12 that the sintered bodies subjected to HIP processing have a relative density of 99 to 100%, and are excellent in bending strength and tenacity at destruction. Further, the above sintered bodies had a low resistivity of $2 \times 10^{-4}$ Ωcm.

EXAMPLE 75

Sintered bodies were made in the same manner as in the EXAMPLES 19 to 23, except that the raw material contained 3% Y$_2$O$_3$ and 2% Al$_2$O$_3$ by volume, as a sintering agent. The sintered bodies thus obtained were subjected to secondary sintering at 1,800° C. for five hours, to become higher in density. The sintered bodies thus processed had a bending strength of 900 to 1,000 MN/m$^2$ at room temperature. However, the bending strength decreased to about 300 MPa when the sintered bodies were heated to 1,200° C., since grain boundaries of each sintered body were softened at 1,200° C. The sintered bodies subjected to the secondary sintering had a low resistivity of $8 \times 10^{-4}$ Ωcm, and hence can be used in a low temperature range, without producing any trouble. Further, the change rate of size due to secondary sintering was not greater than 7%, and hence no substantial deformation was observed. Accordingly, a body having a complicated shape can be readily made by secondary sintering, provided that a sintered body obtained by primary sintering is cut into a shape substantially equal to the complicated shape.

EXAMPLES 76 to 86

Sintered bodies were made in the same manner as in the EXAMPLE 1, except that inorganic compounds shown in Table 13 were added instead of TiN powder.

The characteristics of the sintered bodies thus obtained are shown in Table 13.

We claim:

1. A sintered ceramic material consisting essentially of: first particles of at least one member selected from the group consisting of TiN, TiB$_2$, TiC, ZrN, ZrC, ZrB$_2$, Cr$_2$N, Cr$_3$C$_2$, CrB, HfN, HfC, TaN, TaC, TaB$_2$, NbN, NbC, NbB$_2$, WC, W$_2$C, Mo$_2$N, Mo$_2$C, MoB, VN, VC, WSi$_2$, TiSi$_2$, ZrSi$_2$, NbSi$_2$, TaSi$_2$, CrSi$_2$, MoSi$_2$, Cr$_7$, C$_2$, CeC$_2$, each having an electric resistivity not greater than 10$^{-3}$ Ωcm; second particles consisting essentially of silicon nitride; and whiskers consisting essentially of silicon nitride; wherein said first particles are interlocked with each other by means of said second particles and said whiskers, said sintered material having porosity of 5 to 30%, and the amount of said whiskers being 1 to 70% by weight based on the sum of said second particles and said whiskers; said sintered material having a resistivity ranging from $4.2 \times 10^{-5}$ to $2.8 \times 10^0$ Ωcm, being substantially free from glass phase and having a bending strength ranging from 140 to 510 MN/m$^2$ at 1200° C., said bending strength being substantially the same as that at room temperature.

2. A sintered ceramic material according to claim 1, wherein said first particles are of at least TiN.

3. A sintered ceramic material according to claim 1, wherein the combined amount of said second particles and said whiskers is 20 to 90 parts by volume and the amount of said particles is 80 to 10 parts by volume.

4. A sintered ceramic material according to claim 1, wherein said second particles and said whiskers further include ferrosilicon containing no greater than 70% by weight Fe.

5. A sintered ceramic material consisting essentially of: a matrix of first particles of at least one compound selected from the group consisting of TiN, TiB$_2$, TiC, ZrN, ZrC, ZrB$_2$, Cr$_2$N, Cr$_3$C$_2$, CrB, HfN, HfC, TaN,

TABLE 13

| example No. | inorganic compound in sintered body (30 vol %) | resistivity at 20° C. (Ωcm) | bending strength at 1200° C. (MN/m$^2$) | thermal shock resisting value (number of repetitions) | increase in quantity due to oxidation at 1,200° C. for 50 hours in the atmosphere (mg/cm$^2$) |
|---|---|---|---|---|---|
| 76 | SiC | $4.2 \times 10^4$ | 392 | 52 | 0.6 |
| 77 | Si$_3$N$_4$ | $2.8 \times 10^{15}$ | 383 | 48 | 0.9 |
| 78 | AlN | $7.4 \times 10^{15}$ | 387 | 49 | 2.4 |
| 79 | Al$_2$O$_3$ | $8.2 \times 10^{15}$ | 376 | 48 | 0.5 |
| 80 | Si$_2$O$_3$ | $4.5 \times 10^{14}$ | 359 | 48 | 1.2 |
| 81 | ZrO$_2$ | $4.3 \times 10^{15}$ | 376 | 49 | 0.9 |
| 82 | TiO$_2$ | $6.2 \times 10^{14}$ | 394 | 48 | 1.2 |
| 83 | SiO$_2$ | $5.3 \times 10^{15}$ | 361 | 47 | 1.1 |
| 84 | BeO | $4.8 \times 10^0$ | 376 | 49 | 0.9 |
| 85 | MgO | $8.2 \times 10^{14}$ | 354 | 47 | 0.9 |
| 86 | Fe$_2$O$_3$ | $3.5 \times 10^4$ | 374 | 47 | 1.8 |

TaC, TaB$_2$, NbN, NbC, NbB$_2$, WC, W$_2$C, Mo$_2$N, Mo$_2$C, MoB, VN, VC, WSi$_2$, TiSi$_2$, ZrSi$_2$, NbSi$_2$, TaSi$_2$, CrSi$_2$, MoSi$_2$, Cr$_7$C$_2$, CeC$_2$, each having an electric resistivity not greater than $10^{-3}$ $\Omega$cm; and a second particles consisting essentially of silicon nitride and whiskers consisting essentially of silicon nitride; wherein said first particles of the compound are interlocked with each other by means of said second particles and said whiskers, said sintered material having a porosity of 5 to 30%, and the amount of said whiskers being 1 to 70% by weight based on the sum of said second particles and said whiskers; said sintered material having a resistivity ranging from $4.2\times10^{-5}$ to $2.8\times10^0$ $\Omega$cm, being substantially free from glass phase and having a bending strength ranging from 140 to 510 MN/m$^2$ at 1200° C., said bending strength being substantially the same as that at room temperature.

6. A sintered ceramic material according to claim 5, wherein said particles of the compound are of at least TiN.

7. A sintered ceramic material according to claim 5, wherein the amount of said second particles and the whiskers is 20 to 90 parts by volume and the amount of said first particles is 80 to 10 parts by volume.

8. A sintered ceramic material according to claim 5, wherein said second particles and said whiskers further include ferrosilicon containing no greater than 70% by weight Fe.

9. A sintered ceramic material consisting essentially of a matrix of first particles of at least one compound selected from the group consisting of TiN, TiB$_2$, TiC, ZrN, ZrC, ZrB$_2$, Cr$_2$N, Cr$_3$C$_2$, CrB, HfN, HfC, TaN, TaC, TaB$_2$, NbN, NbC, NbB$_2$, WC, W$_2$C, Mo$_2$N, Mo$_2$C, MoB, VN, VC, WSi$_2$, TiSi$_2$, ZrSi$_2$, NbSi$_2$, TaSi$_2$, CrSi$_2$, MoSi$_2$, Cr$_7$C$_2$, CeC$_2$, each having an electric resistivity not greater than $10^{-3}$ $\Omega$cm; and second particles consisting essentially of silicon nitride and whiskers consisting essentially of silicon nitride; wherein said first particles of the compound are interlocked with each other by means of said second particles and said whiskers, said sintered ceramic material having a positive temperature coefficient of resistance, said sintered ceramic material having a porosity of 5 to 30%, the amount of said whiskers being 1 to 70% by weight based on the sum of said second particles and said whiskers; said sintered material having a resistivity within the range from $4.2\times10^{-5}$ to $2.8\times10^0$ $\Omega$cm, being substantially free from glass phase and having a bending strength ranging from 140 to 510 MN/m$^2$ at 1200° C., said bending strength being substantially the same as that at room temperature.

10. A sintered ceramic material according to claim 9, wherein said first particles of the compound are of at least TiN.

11. A sintered ceramic material according to claim 9, wherein the amount of said second particles and said whiskers is 20 to 90 parts by volume and the amount of said first particles if 80 to 10 parts by volume.

12. A sintered ceramic material according to claim 9, wherein said second particles and said whiskers further include ferrosilicon containing no greater than 70% by weight Fe.

13. A sintered ceramic material according to claim 1, wherein said second particles and said whiskers further include Si$_2$N$_2$O and SiO$_2$.

14. A sintered ceramic material according to claim 5, wherein said second particles and said whiskers further include Si$_2$N$_2$O and SiO$_2$.

15. A sintered ceramic material according to claim 9, wherein said second particles and said whiskers further include Si$_2$N$_2$O and SiO$_2$.

16. A sintered ceramic material produced by the process comprising the steps of:
preparing a molded article comprising a first powder of metallic silicon and/or ferrosilicon powder; a second powder of at least one compound selected from the group consisting of TiN, TiB$_2$, TiC, ZrN, ZrC, ZrB$_2$, Cr$_2$N, Cr$_3$C$_2$, CrB, HfN, HfC, TaN, TaC, TaB$_2$, NbN, NbC, NbB$_2$, WC, W$_2$C, Mo$_2$N, Mo$_2$C, MoB, VN, VC, WSi$_2$, TiSi$_2$, ZrSi$_2$, NbSi$_2$, TaSi$_2$, CrSi$_2$, MoSi$_2$, Cr$_7$C$_2$, CeC$_2$, each having an electric resistivity not greater than $10^{-3}$ $\Omega$cm; and a binder for forming said first and second powders into said article;
subjecting said binder to decomposition so as to make said article porous so that gaseous substances can permeate into the pores of said article; and
sintering said porous article in a nitrogen atmosphere containing less than 50 ppm of oxygen at an elevated temperature of at least 1350° C., whereby nitrogen gas reacts with said first powder to form particles consisting essentially of silicon nitride and whiskers containing essentially of silicon nitride, the amount of said whiskers being 1 to 70% by weight based on the sum of said particles and whiskers consisting essentially of silicon nitride so as to interlock particles of said second powder.

17. A sintered ceramic material produced by a process according to claim 16, wherein said second powder is of at least TiN.

18. A sintered ceramic material produced by a process according to claim 16, wherein the combined amount of said particles consisting essentially of silicon nitride and said whiskers is 20 to 90 parts by volume and the amount of said particles of the second powder is 80 to 10 parts by volume.

19. A sintered ceramic material produced by a process according to claim 16, wherein said ferrosilicon powder contains no greater than 70% by weight Fe.

20. A sintered ceramic material produced by a process comprising the steps of:
preparing a molded article comprising a first powder of metallic silicon and/or ferrosilicon powder; a second powder having an average particle size no greater than 100 microns and of at least one compound selected from the group consisting of carbides, oxides, nitrides, borides, oxynitrides and silicides of elements belonging to IIIa, IIIb, IVa, IVb, Va, VIa and VIII of the Periodic Table, wherein said at least one compound includes a member having an electric resistivity not greater than 10 $\Omega$cm; and a binder for forming said first and second powders into said article;
subjecting said binder to decomposition so as to make said article porous so that gaseous substances can permeate into the pores of said article; and
sintering said porous article in a nitrogen atmosphere containing less than 50 ppm of oxygen at an elevated temperature of at least 1350° C., whereby nitrogen gas reacts with said first particles to form particles consisting essentially of silicon nitride and whiskers consisting essentially of silicon nitride, the amount of said whiskers being 1 to 70% by weight based on the sum of said particles and whiskers consisting essentially of silicon nitride so as to interlock particles of said second powder.

21. A sintered ceramic material produced by a process according to claim 20, wherein the second powder is of at least TiN.

22. A sintered ceramic material produced by a process according to claim 20, wherein the combined amount of said particles consisting essentially of silicon nitride and said whiskers is 20 to 90 parts by volume and the amount of said particles of the second powder is 80 to 10 parts by volume.

23. A sintered ceramic material produced by a process according to claim 20, wherein said ferrosilicon powder contains no greater than 70% by weight Fe.

24. A sintered ceramic material produced by a process comprising the steps of:

preparing a molded article comprising a first powder of metallic silicon and/or ferrosilicon powder; a second powder of at least one compound selected from the group consisting of carbides, oxides, nitrides, borides, oxynitrides and silicides of elements belonging to IIIa, IIIb, IVa, IVb, Va, VIa and VIII of the Periodic Table, wherein at least one compound includes a member having an electric resistivity not greater than 10 $\Omega$cm; and a binder for forming said first and second powders into said article;

subjecting said binder to decomposition so as to make said article porous so that gaseous substances can permeate into the pores of said article; and sintering said porous article in a nitrogen atmosphere containing less than 50 ppm of oxygen at an elevated temperature of at least 1350° C., whereby nitrogen gas reacts with said first powder to form particles consisting essentially of silicon nitride and whiskers consisting essentially of silicon nitride, the amount of said whiskers being 1 to 70% by weight based on the sum of said particles and whiskers consisting essentially of silicon nitride so as to interlock particles of said second powder.

25. A sintered ceramic material produced by a process according to claim 24, wherein said second powder is of at least TiN.

26. A sintered ceramic material produced by a process according to claim 24 wherein the combined amount of said particles and whiskers consisting essentially of silicon nitride is 20 to 90 parts by volume and an amount of said particles of said second powder is 80 to 10 parts by volume.

27. A sintered ceramic material produced by a process according to claim 24, wherein said ferrosilicon powder contains no greater than 70% by weight Fe.

* * * * *